United States Patent [19]
Ryberg

[11] Patent Number: 5,635,819
[45] Date of Patent: Jun. 3, 1997

[54] METHOD OF CHARGING A BATTERY

[75] Inventor: Bertil Ryberg, Torslanda, Sweden

[73] Assignee: AB Volvo Penta, Sweden

[21] Appl. No.: 331,649

[22] PCT Filed: May 11, 1993

[86] PCT No.: PCT/SE93/00411

§ 371 Date: Dec. 14, 1994

§ 102(e) Date: Dec. 14, 1994

[87] PCT Pub. No.: WO93/23906

PCT Pub. Date: Nov. 25, 1993

[30] Foreign Application Priority Data

May 11, 1992 [SE] Sweden .................................. 9201476

[51] Int. Cl.$^6$ .................................................. H02J 7/24
[52] U.S. Cl. .......................... 320/30; 320/39; 320/48; 320/49
[58] Field of Search ........................ 320/9, 12, 27, 320/29, 39, 49, 51, 54, 63, 48

[56] References Cited

U.S. PATENT DOCUMENTS 4,136,311  1/1979  Scheidler .................................. 320/37

FOREIGN PATENT DOCUMENTS 2550396   2/1985   France .

*Primary Examiner*—Edward Tso
*Attorney, Agent, or Firm*—Lerner, David, Littenberg, Krumholz & Mentlik

[57] ABSTRACT

A method and a device for charging a rechargeable battery by means of a generator which delivers regulating voltage from a voltage regulator receiving a value indicative of the battery voltage in order to regulate the generator in response to the voltage in relation to predetermined nominal charging voltage. A voltage drop may be introduced between the battery and the regulator in dependence of the operational condition of the battery, the voltage drop reducing the battery the voltage value received by the regulator. In accordance with the invention, the voltage drop is introduced between the positive terminal of the battery and the regulator by connection of a diode which is forward biased. The voltage drop is introduced in dependence of the battery voltage.

10 Claims, 2 Drawing Sheets

METHOD OF CHARGING A BATTERY

FIELD OF THE INVENTION

The subject invention concerns a method of charging a rechargeable battery, according to which method the charging is effected by means of a generator to which a regulating voltage is supplied from a voltage regulator receiving a value indicative of the battery voltage for regulation of the generator in response to said voltage value in relation to a predetermined nominal charging voltage, and a voltage drop may be introduced between the battery and the regulator in dependence of the operational condition of the battery, said voltage drop reducing the value indicative of the battery voltage received by the regulator. The invention also concerns a device for performing the method.

The invention is intended to be used in connection with recharging of the starter battery of marine motors. The invention has particular application in sailing boats, since the motors used in sailing boats normally are run a mere 20–30 minutes at each instance of operation. In consequence thereof, the battery may not always be recharged to its full capacity.

BACKGROUND OF THE INVENTION

The recharge of a starter battery normally is effected with the aid of an AC generator. One such prior-art generator is supplied with regulating voltage from a voltage regulator which in turn senses a reference voltage from the positive terminal of the battery. If the reference voltage is lower than a value corresponding to a certain nominal charging voltage, the regulator will affect the generator, bringing the latter to increase the charging voltage supplied to the battery. In a corresponding manner, the generator will reduce the charging voltage supplied to the battery when the reference voltage exceeds the nominal reference voltage. This arrangement ensures that recharging of the battery always is effected at a voltage value that is essentially constant and equal to the nominal charging voltage.

It is generally desired that the battery may be charged as quickly as possible in order that the battery be ready quickly to cope with new current drains. In principle, this possibility is conditioned on the nominal value of the voltage being set to a comparatively high level to ensure that the charging of the battery progresses at a high level of charging current for as long as possible. In reality, however, it is necessary to restrict the nominal voltage, on the one hand not to risk damages on the battery, and on the other to avoid gassing in the battery, which would involve safety hazards.

From FR 2 550 396 is previously known a device by means of which a battery may be charged rapidly at a voltage not exceding the nominal voltage. This is achieved by introducing a certain voltage drop between the positive terminal of the battery and the regulator, whereby the regulator is "conned" into acting as if the reference voltage is lower than it actually is. In this manner the voltage delivered by the generator will amount to the nominal voltage increased by the introduced voltage drop. In order not to risk that the battery be damaged, this voltage drop is maintained over a predetermined, restricted period of time, say over 30 minutes, after which period the charging again equals the nominal charging voltage.

One disadvantage inherent in this method is that it impossible to establish whether or not the battery has succeeded in reaching the fully charged condition after the lapse of the selected period. In accordance with one embodiment of this prior-art device the voltage drop therefore may be introduced in response to the magnitude of the battery charging current, which is measured and is compared with a predetermined limit value. As long as the charging current does not exceed this limit value, the voltage drop will be applied, and the battery will be charged at a voltage that is higher than the nominal voltage. This version, too, suffers from a disadvantage inasmuch as the measurement of the current is effected by means of a Hall probe with resulting too complicated and too expensive a measuring procedure.

SUMMARY OF THE INVENTION

The subject invention has for its purpose to enable rapid charging of a rechargeable battery by optimum use of the generator capacity over a predetermined limited period of time. This purpose is achieved by means of a method of the kind defined in the introduction, which is characterized in that the voltage drop is introduced between the positive terminal of the battery and the regulator by connection of a diode which is forward biased, and in that the voltage drop is introduced in response to the battery voltage.

The invention provides a device of simple construction having only small number of components and therefore possible to produce at a low cost. The very measuring of the battery voltage is effected by means of an uncomplicated voltage measuring circuit. In addition, the device may be installed in a simple manner in existing regulating equipment in that it may easily be connected between the battery and the regulator. The subject invention makes use of the generator capacity in a more optimum degree and the charging of the battery may be effected to a fuller extent than has hitherto been possible.

BRIEF DESCRIPTION OF THE DRAWINGS

The invention will be described in closer detail in the following with reference to the accompanying drawings, wherein.

DETAILED DESCRIPTION OF THE PREFERRED EMBODIMENT

Figure 1:
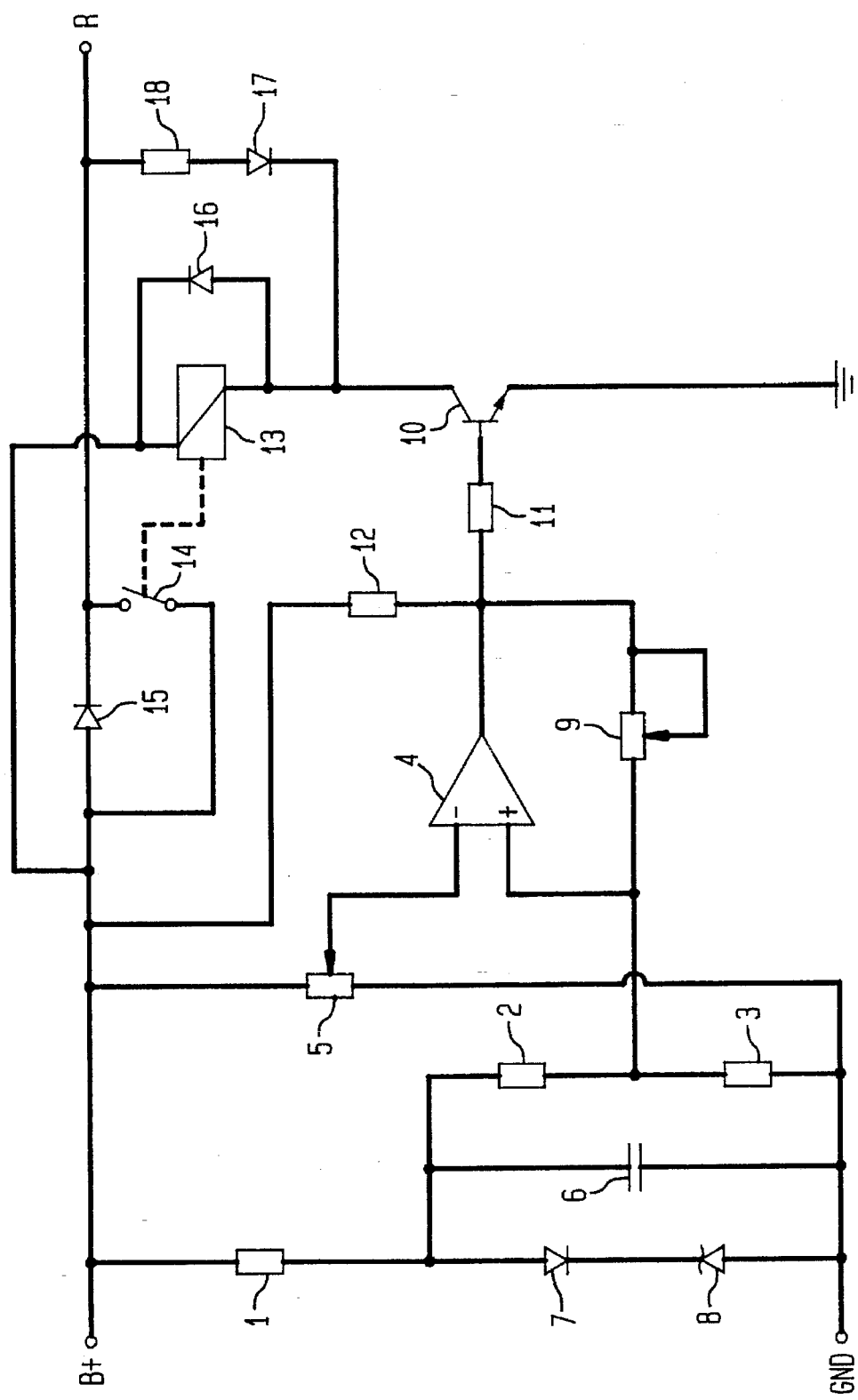
FIG. 1 is circuit diagram relating to a device in accordance with the invention.

FIG. 1 illustrates schematically a device for performing the invention. A resistor 1 is connected to the positive terminal of the battery (not shown) via switch B+. The opposite end of the resistor 1 is connected to a voltage divider formed by two additional resistors 2, 3. The voltage obtained at an outlet in the node point between the two resistors 2 and 3 is applied to the positive input terminal of an operational amplifier 4 which is coupled as a comparator. A variable resistor 5 is connected between the positive terminal of the battery, indicated by B+ in the drawing figure, and the negative terminal of the battery, indicated by GND (ground). The variable central outlet of the resistor 5 is connected to the negative output terminal of the operational amplifier 4.

A capacitor 6 which is connected between the resistor 1 and earth is intended to eliminate the ripple effect, i.e. small voltage fluctuations. Two diodes 7, 8 which are coupled in parallel with the voltage divider 2, 3 serve to render the measuring of the battery voltage independent of temperature variations and to form a reference voltage that is supplied to the positive input terminal of the operational amplifier 4. One, 7, of the diodes has its anode connected to the positive terminal (B+) of the battery and its cathode is connected to the cathode of the second diode 8. The second diode 8, which is of zener type, has its anode connected to the negative terminal (GND) of the battery. The combination formed by diodes 7, 8 has a temperature compensating effect (diode 8 has a positive temperature coefficient whereas diode 7 has a negative temperature coefficient).

The base of a transistor 10 is connected to the output terminal of the operational amplifier 4 via a current-limiting resistor 11. A resistor, known as a pull-up resistor 12 is connected between the positive terminal (B+) of the battery and the output terminal of the operational amplifier 4 in order to supply current to the transistor 10. As long as the voltage value on the negative input terminal of the operational amplifier 4 is lower than the voltage value on the positive output terminal thereof, the output terminal of the operational amplifier 4 will be high, which means that the transistor 10 is turned on. In reality, this condition corresponds to the situation when the motor has just been started and the battery needs to be recharged as rapidly as possible.

A relay 13 which is connected in series with the transistor 10 and which is provided with a protective diode 16, is activated at this stage. This means that the pair of switches 14 incorporated in the relay 13 are open. In consequence thereof a diode 15 which is coupled in parallel with the pair of switches 14 and connected with the voltage regulator cathode (not shown) via a switch R, is connected in the circuit between the battery and the voltage regulator. The voltage received by the regulator and now serving as the regulating voltage to allow the generator to recharge the battery, is at this stage equal to the battery voltage less the forward voltage drop existing across the diode 15. In other words, the regulator is "conned" into believing that the battery voltage is lower than it actually is.

As the battery is being recharged, the battery voltage will increase accordingly, and when the voltage has reached a certain upper limit value (which is determined by setting the variable resistor 5), the voltage on the negative input terminal of the operational amplifier 4 will be higher than the voltage on the positive input terminal thereof, which means that the output terminal of the operational amplifier 4 goes low and the transistor 10 is turned off. As a result, the relay 13 is deactivated, corresponding to closing of the pair of switches 14. In turn, this means that the diode 15 is short-circuited. From the moment when the battery voltage has reached its upper limit value the voltage regulator thus will sense the "true" battery voltage.

When the battery voltage has again sunk to a level below a predetermined lower limit value, the voltage on the negative input terminal of the operational amplifier will again be lower than the voltage on its positive input terminal. The lower limit value is determined by the setting of a variable resistor 9 which is connected between the output terminal of the operational amplifier 4 and the positive input therof. This creates a hysteresis effect. In conformity with the above description, the diode 15 will again be connected in the circuit and the charging of the battery is restarted. This lower limit value normally is selected so as to correspond to the situation when the motor has been turned off.

During the charging, the regulator thus senses a battery voltage that is lower than the actual voltage level, and consequently the battery charging will continue at the maximum charging current level from the generator during a longer period of time than it otherwise would have done, i.e. had said voltage drop not been introduced. The upper limit value of the battery voltage is chosen to a higher level than the nominal charging voltage level but still it is limited so as to ensure that the battery is not damaged or that dangerous gassing occurs.

The circuit also comprises a light-emitting diode 17 with an associated current-restricting resistor 18 which is coupled across the coil of the relay 13. The light-emitting diode 17 indicates that the transistor is turned on, i.e. that the diode 15 is connected in the circuit.

Figure 2:
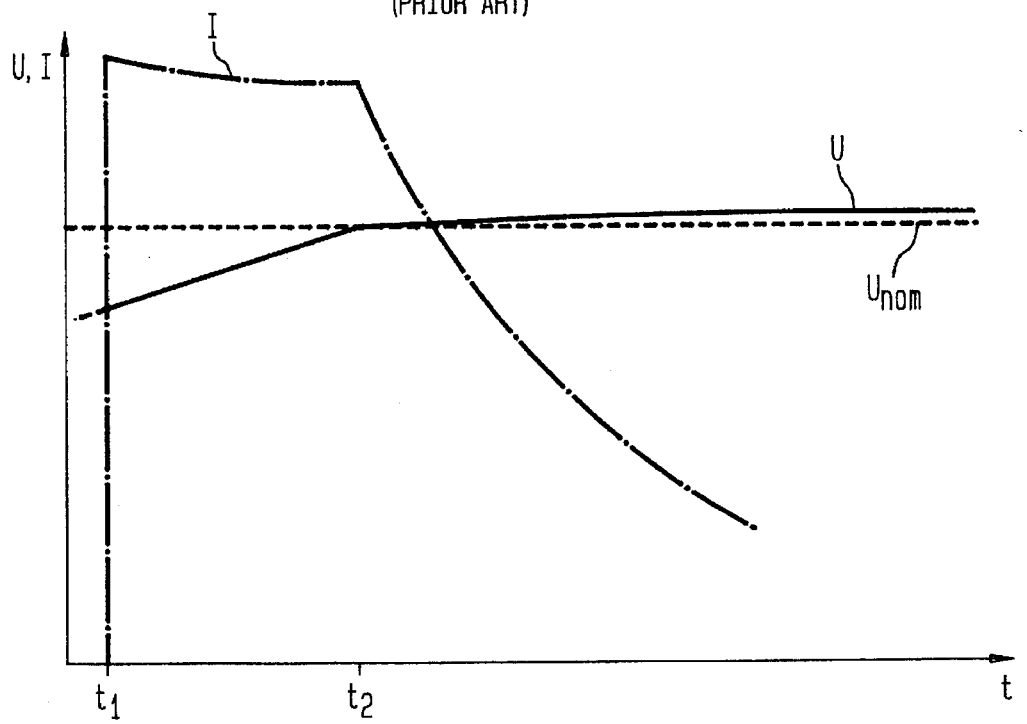
FIG. 2 is a diagrammatical representation of a charging process in accordance with the prior-art technique.

FIG. 2 illustrates in a diagram the sequence of charging a battery in accordance with prior-art technique, i.e. where no device in accordance with the invention has been used. The Y-axis of the diagram indicates the battery voltage U and the battery current I, i.e. the current delivered by the generator to the battery. The X-axis denotes the time t. The battery voltage U is indicated in the diagram by a continuous line whereas the battery current I is indicated by a dash-and-dot line. The level of the nominal voltage $U_{nom}$ is indicated by a broken line.

When the battery charging starts, at time $t_1$, the battery current I will assume a high level with the result that a considerable charge will be delivered to the battery. The battery voltage U, originally at a comparatively low level, will increase until, at a certain time $t_2$, it reaches the value of the nominal voltage $U_{nom}$, whereupon the regulator will signal to the generator to deliver a lower battery voltage, resulting in a reduction of current I. The battery voltage is thereafter maintained at a level essentially agreeing with the nominal voltage. In a conventional battery of 12 V, the nominal voltage preferably is chosen to approximately 14.0–14.2 V, at a temperature of 20°–25° C.

Figure 3:
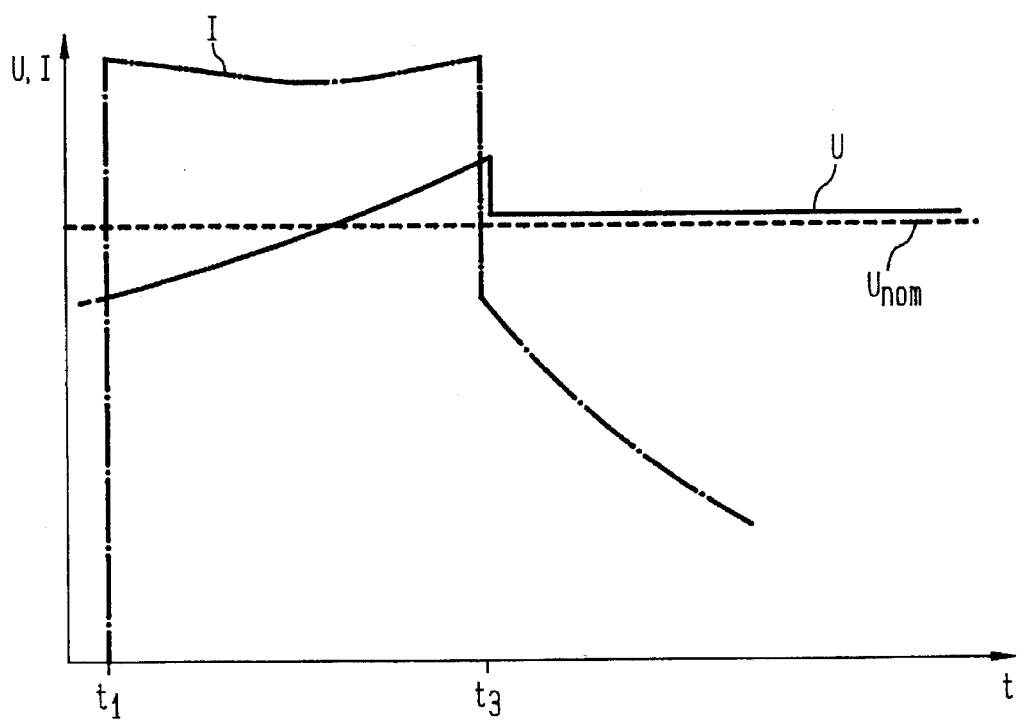
FIG. 3 is a similar diagrammatical representation of a corresponding charging process when using the invention.

FIG. 3 illustrates a sequence of charging a battery when the device in accordance with the invention has been used. The battery voltage U, i.e. the voltage existing between switches B+ and GND (see FIG. 1), is comparatively low in the initial stage, and for this reason a voltage drop will be introduced in accordance with the description above. In a conventional battery of 12 V, having a nominal voltage of 14.0 V, and with the introduction of a voltage drop across the diode 15 of for instance 0.6 V, the regulator thus will bring the generator to deliver maximum level battery current to the battery until the "true" battery voltage U has risen to 14.6 V. This is indicated in the diagram by time $t_3$. "True" battery voltage U of 14.6 V then corresponds to a voltage level of 14.0 V received by the regulator.

Practical tests have shown that in conventional charging (according to FIG. 2) the time $t_2$ occurs approximately 24 minutes after time $t_1$. In charging in accordance with the invention (according to FIG. 3) time $t_3$ occurs about 34 minutes after time $t_1$. This corresponds to an increase of the charge, i.e. the number of ampere hours delivered to the battery, of about 9% when the invention is used, compared to the situation when conventional techniques are used.

I claim:

1. A device for connection between a terminal of a battery and a voltage sensing reference terminal of a voltage regulator, said device comprising:

(a) a first terminal for connection to the terminal of the battery;

(b) a second terminal for connection to the reference terminal of the voltage regulator;

(c) a diode;

(d) a switching circuit having a first condition in which said first terminal is connected to said second terminal through said diode so that the diode provides a voltage drop between said first terminal and said second terminal and a second condition in which said first terminal is directly connected to said second terminal and the diode does not provide a voltage drop between the first and second terminals; and (e) means for controlling the switching circuit to switch between said first and second conditions responsive to voltage applied at said first terminal, said means for controlling being operative to place said switching circuit into said first condition when said voltage at said first terminal is lower than a lower limit and to place said switching circuit into said second condition when said applied voltage is above an upper limit greater than said lower limit, whereby, when the device is connected between the battery and regulator, the device will either apply the full voltage of the battery to the reference terminal of the regulator, or apply a voltage drop between the battery terminal and the reference terminal of the regulator depending upon the state of charge of the battery.

2. A device as claimed in claim 1, wherein said means for controlling includes a source of a reference voltage, a comparator having a first input connected said first terminal so that the first input receives a voltage proportional to the voltage at the first terminal, said comparator also having a second input connected to said source of said reference voltage, said comparator having an output node and providing an output voltage at said output node which has either a first polarity or a second polarity dependent upon the voltage at said first terminal.

3. A device as claimed in claim 2, wherein said means for controlling also includes a feedback connection between said output node and one of said inputs.

4. A device as claimed in claim 3, wherein said feedback connection includes feedback resistor connected between said output node and one of said inputs.

5. A device as claimed in claim 4, wherein said first input is connected to said first terminal through a first resistor.

6. A device as claimed in claim 5, wherein said second input is connected to said source of reference voltage through a second resistor.

7. A device as claimed in claim 6, wherein said feedback resistor is connected between said output node and said second input.

8. A device as claimed in claim 2, wherein said switching circuit includes an electronically controlled switch adapted to switch between said first and second conditions by connecting and disconnecting said diode between said first terminal and said second terminal.

9. A device as claimed in claim 8, wherein said switch is a relay controllable by the output voltage of said comparator.

10. A method for recharging a battery connected to a generator comprising the steps of:

(a) actuating the generator to apply charging current to the battery;

(b) regulating the charging current supplied by the generator by means of a voltage regulator having a voltage sensing reference terminal;

(c) connecting the reference terminal of the regulator to a terminal of the battery through a diode when the voltage at the battery terminal is below a lower limit, so that the diode imposes a voltage drop between the battery terminal and the reference terminal; and (d) connecting the reference terminal of the regulator to the battery terminal directly when the voltage at the battery terminal is above an upper limit, so that the diode does not impose a voltage drop between the battery terminal and the reference terminal, and wherein said lower limit is less than said upper limit said battery terminal and said reference terminal remaining connected through said diode as the voltage at said battery terminal rises from said lower limit to said upper limit, and said battery terminal and said reference terminal remaining directly connected as the voltage at said battery terminal decreases from said upper limit to said lower limit.

* * * * *